United States Patent
Srivastava

(10) Patent No.: US 7,461,070 B2
(45) Date of Patent: Dec. 2, 2008

(54) MODULAR CONFIGURATION AND DEPLOYMENT OF JDBC RESOURCES

(75) Inventor: Rahul Srivastava, Randolph, NJ (US)

(73) Assignee: Bae Systems, Inc., San Jose, CA (US)

( * ) Notice: Subject to any disclaimer, the term of this patent is extended or adjusted under 35 U.S.C. 154(b) by 321 days.

(21) Appl. No.: 11/295,284

(22) Filed: Dec. 6, 2005

(65) Prior Publication Data

US 2007/0088721 A1    Apr. 19, 2007

Related U.S. Application Data

(60) Provisional application No. 60/727,188, filed on Oct. 14, 2005.

(51) Int. Cl.
*G06F 17/30* (2006.01)

(52) U.S. Cl. ..................... 707/10; 707/104.1

(58) Field of Classification Search ............ 707/1, 707/104.1; 717/177; 719/310
See application file for complete search history.

(56) References Cited

U.S. PATENT DOCUMENTS

| | | | |
|---|---|---|---|
| 7,032,014 B2 * | 4/2006 | Thiyagarajan et al. | 709/220 |
| 7,178,149 B2 * | 2/2007 | Hansen | 719/310 |
| 7,210,143 B2 * | 4/2007 | Or et al. | 717/174 |
| 7,260,819 B2 * | 8/2007 | Spotswood et al. | 717/177 |

\* cited by examiner

*Primary Examiner*—Yicun Wu
(74) *Attorney, Agent, or Firm*—Fliesler Meyer LLP

(57) ABSTRACT

The JDBC data sources configuration can be stored in a JDBC configuration XML. This configuration XML can be converted into Java beans to configure data sources such as basic data sources, connection pools or multipool. Migration can be done by using a administration console tool to update the configuration XML with the new binding variables for the production environment.

6 Claims, 2 Drawing Sheets

MODULAR CONFIGURATION AND DEPLOYMENT OF JDBC RESOURCES

CLAIM OF PRIORITY

This application claims priority to U.S. Provisional Application No. 60/727,188 entitled "Modular Configuration and Deployment of JDBC Resources" by Rahul Srivastava, filed Oct. 14, 2005.

BACKGROUND OF INVENTION

Application servers such as the WebLogic server available from BEA Systems of San Jose, Calif. allow users to do a number of functions. One of the functions that can be allowed by the application servers is to provide access to a database. In one embodiment, the application servers provide Java Database Connectivity (JDBC) for connection to a database. JDBC technology is an API defined in J2EE that provides DBMS connectivity to a wide range of databases and access to other tabular data sources, such as spreadsheets or flat files. With a JDBC technology-enabled driver, a user can connect to corporate data even in a heterogeneous environment. JDBC defines data sources such as the relational databases and flat files using basic implementations, connection pooling implementations and distributed transaction implementation.

DETAILED DESCRIPTION

Figure 1:
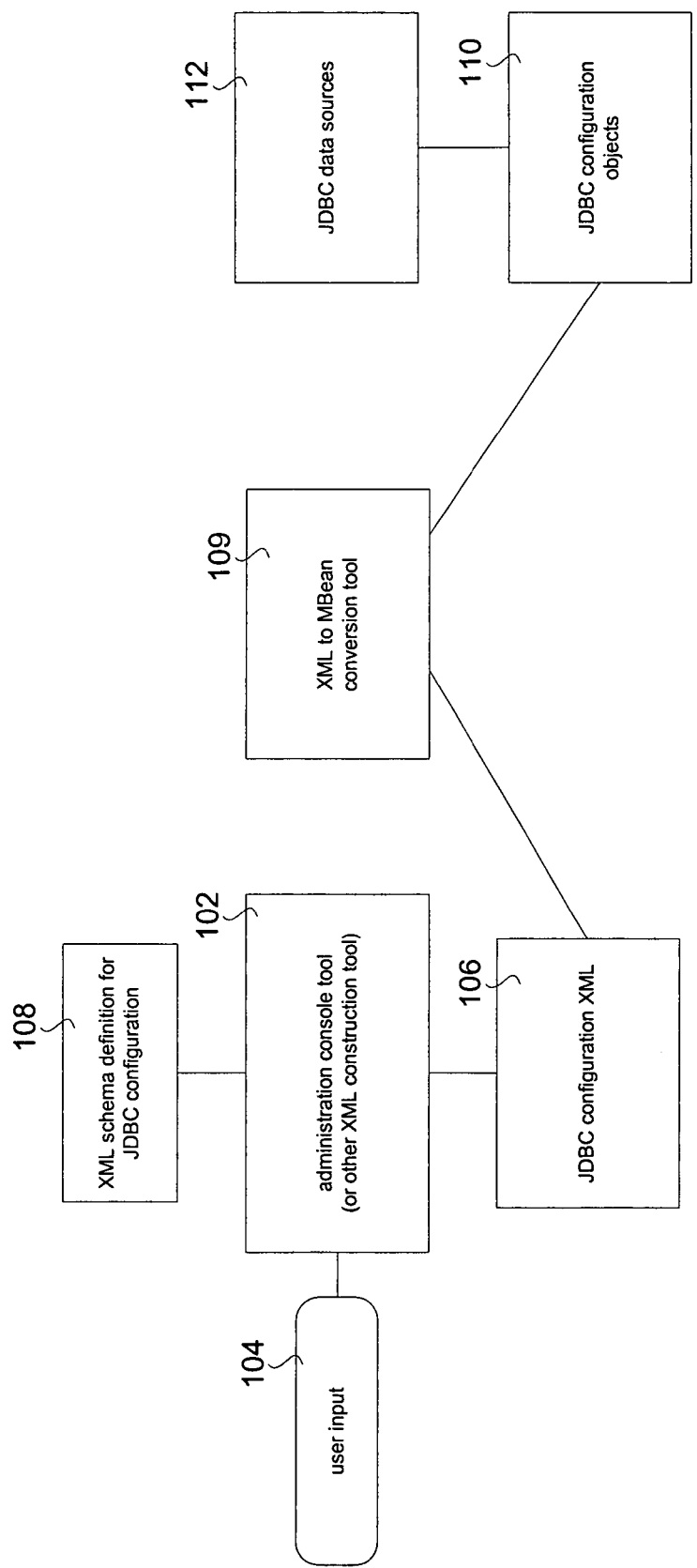
FIG. 1 is a diagram illustrating the use of JDBC configuration XML.

FIG. 1 illustrates the use of JDBC configuration XML. In one embodiment, an administration console tool 201 or other XML construction tool receives user input concerning the configuration of data sources. For propose of this application, the data sources can include basic data sources, XA protocol data sources, connection pool data sources, and multipool data sources. The data sources can be global or local. The user input 104 is used to construct JDBC configuration XML 106 for the data source. An XML schema definition 108 can define the structure of the XML and allow other tools to use the configuration in the XML to configure data sources. In one embodiment, a XML MBean conversion tool converts the configuration XML into an Mbean 110 used for configuring the JDBC data sources 112. In one embodiment, the configuration objects can map to the JDBC XML schema 108.

Figure 2:
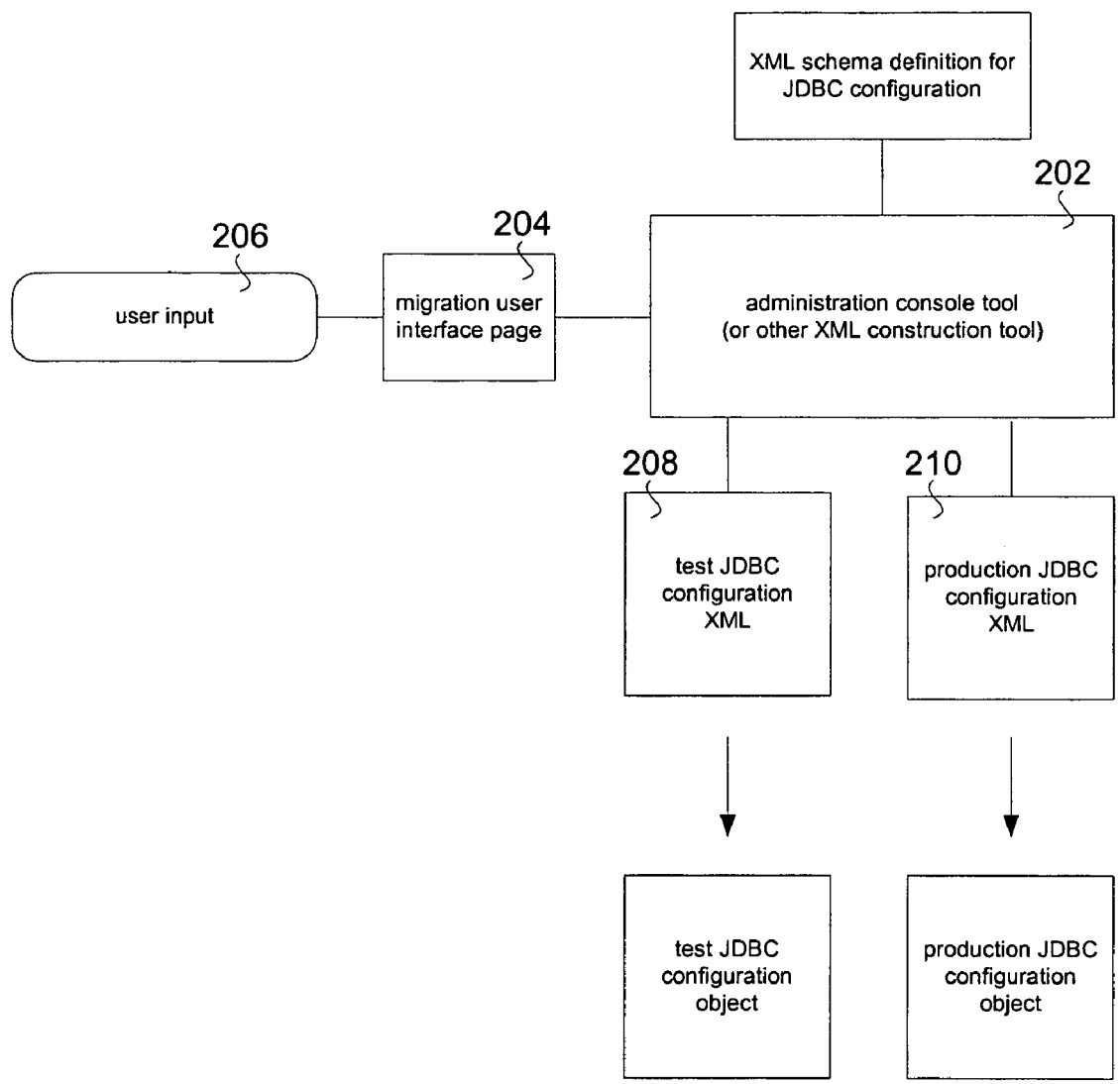
FIG. 2 is a diagram illustrating the use of test and production JDBC configuration XML.

FIG. 2 illustrates an example of migration. The administration console tool 202 can provide a migration user interface page 204 for receiving user input 206 of the binding variables. The administration console tool 202 can automatically convert the test JDBC configuration 208 into a production JDBC configuration XML 210 by changing the values of the binding variables as input by the user. Both test and production JDBC configuration XML can be converted into configuration objects to be used by the data sources.

In one embodiment, Java Database Connectivity (JDBC) data sources are configurable with XML configuration files. The XML configuration files can be used to obtain configuration information for the Java Database Connectivity (JDBC) data sources.

In one embodiment, a tool can convert the XML configuration files into configuration objects for the Java Database Connectivity (JDBC) data sources. The configuration objects can be MBeans or other Java Beans. Migration to a new environment can include producing an updated XML configuration file, such as a configuration file for the production environment. A tool can be used to update the XML file by inputting new binding variables.

A tool can provide a two phase deployment of data source configuration. In one embodiment, the two-phase deployment can be done such that if the deployment of the updated configuration fails, the configuration can roll back to the previous configuration.

The XML configuration files can be locally or globally scoped. In one embodiment of the present invention, a system including Java Database Connectivity (JDBC) data sources that are configurable with XML configuration files. The XML configuration files being used to obtain configuration information for the Java Database Connectivity (JDBC) data sources. A tool can be used to modify XML configuration files to produce updated XML configuration files and; a deployment tool can be used to deploy the updated configuration in a two-phase process that rolls back to the prior configuration upon a failure of the deployment of the updated configuration. In one embodiment, the original XML configuration files contain test configurations and the updated XML configuration files contain production configurations. The XML configuration files can be converted into configuration objects for the Java Database Connectivity (JDBC) data sources. The tool can be used to update the XML file by inputting new binding variables. The XML configuration files can be locally or globally scoped.

One embodiment of the present invention is a system including a tool to create at least one XML configuration file for a Java Database Connectivity (JDBC) data source; and a component to use the XML file to configure the Java Database Connectivity (JDBC) data source. The component can convert the XML configuration files into configuration objects for the Java Database Connectivity (JDBC) data source. Migration to a new environment can include producing an updated XML configuration file. The XML configuration files can be updated by inputting new binding variables

DETAILED DESCRIPTION OF ONE NON LIMITING EXAMPLE

The following description gives one non-limiting implementation of one embodiment. The discussion below gives one embodiment, but those skilled in the art will understand that other implementations of the above-described concepts can be done. Any potentially limiting language given below is to be interpreted in the context of the specific non-limiting implementation and is not meant to limit the general concepts.

The external representation and configuration of JDBC objects—Connection Pools, Data Sources, Transactional Data Sources and Multi Pools—can be consolidated into a new type of Data Source object. These new uber-data sources can be defined via a new Java Bean type (weblogicj.2ee.descriptor.wl.JDBCDataSourceBean), which in turn can conform to the new JDBC schema (weblogicj2ee.descriptor.schemas.wls90.weblogic-jdbc.xsd). These data sources can be configurable as both global- and application-scoped JDBC resources. A new configuration MBean type JDBCSystemResourceMBean can act as a container for JDBCDataSourceBeans in the WLS configuration file ("config.xml"). A new WLS-specific extension type of J2EE Module called "JDBC Module" can be defined to contain data sources configured inside a J2EE application or as a standalone J2EE module. New runtime MBean types can be created to support the new data source type and related J2EE Management Objects (JSR77).

Users can monitor application's usage of configured JDBC objects. Additional statistics can be made available for JDBC objects such as multi pools, connection pools and prepared statement caches. Application can be able to register callbacks that will get invoked before and after invocations of methods in the JDBC driver. User can be able to obtain detailed usage profiles of JDBC resources such as connection pools and prepared statement caches. User can be able to debug the usage of JDBC objects such as connections and statements. User can be able to take a Diagnostic Image of the JDBC subsystem when requested for by BEA Support. User can be able to trace the flow of an individual ("dyed") application request through the JDBC subsystem.

- The external representation and configuration of JDBC objects—Connection Pools, Data Sources, Transactional Data Sources and Multi Pools—can be consolidated into a new type of Data Source object.
- These new data sources can be defined via a new Java Bean type (weblogicj2ee.descriptor.wl.JDBCDataSourceBean), which in turn can conform to the new JDBC schema (weblogicj2ee.descriptor.schemas.wls90.weblogic-jdbc.xsd).
- They can be configured as "System Resources" in the WLS configuration file. Or they w can be configured as J2EE Modules, either standalone or embedded inside an EAR file.
- A new configuration MBean type JDBCSystemResourceMBean can be created to act as a container for data sources configured in the WLS configuration file.
- A new WLS-specific extension type of J2EE Module called "JDBC Module" can be defined to contain data sources configured inside a J2EE application or as a standalone J2EE module.
- These data sources can be configurable as both global- and application-scoped resources.
- These data sources can be deployed using the Two-Phase deployment mechanism.
- Data Sources configured as JDBC Modules can be able to use J2EE Deployment Plans for ease of migration between different environments.
- New runtime MBeans mandated by JSR77 can be added.

There can be two types of data sources in one embodiment:

System Resources
- Created by server software Administrator
- Deployed by server software Administrator
- Defined in the server software configuration file, contained inside the configuration MBean JDBCSystemResourceMBean
- Accessed and manipulated at runtime via JMX
- Global-scoped
- Semantically equivalent to the deprecated JDBC configuration mbeans JDBC Modules
- Created by Application Programmer
- Deployed by the server software Administrator
- Defined in the server software configuration file as standalone J2EE modules using the configuration MBean AppDeploymentMBean, or embedded inside application EAR files
- Accessed and manipulated at runtime via weblogic.Deployer and other JSR88-compatible tools
- Global- or application-scoped
- Application-scoped JDBC Modules embedded inside application EARs are semantically equivalent to the deprecated application-scoped JDBC connection pools A JDBC schema can be defined for JDBC. Data Source definitions will be contained inside XML documents ("descriptors") that will conform to this schema. These descriptors can have a suffix of "-jdbc.xml". A new Java Bean type can be defined to represent the new data source object. This Java Bean can map to the new JDBC schema being defined. A new configuration MBean type "JDBCSystemResourceMBean" can be defined to contain global-scoped data sources. A new server software specific extension type of J2EE module called "JDBC Module" can be defined to configure data sources configured as J2EE modules. Data Sources can be deployed using a two-phase deployment mechanism. JSR88 provides a scheme to resolve J2EE applications' environment-specific dependencies (binding and tunable parameters) at deployment time. JDBC subsystem can make the necessary changes to support these requirements. New runtime MBean type JDBCDataSourceRuntimeMBean can deprecate the current runtime MBean type JDBCConnectionPoolRuntimeMBean. New runtime MBean type JDBCMultiDataSourceRuntimeMBean can be added to support MultiPools.

An example of an JDBC schema is given below.

JDBC SCHEMA

```xml
<?xml version="1.0" encoding="UTF-8"?>
<schema
    targetNamespace="http://www.bea.com/ns/weblogic/90"
    xmlns:wls="http://www.bea.com/ns/weblogic/90"
    xmlns="http://www.w3.org/2001/XMLSchema"
    elementFormDefault="qualified"
    attributeFormDefault="unqualified"
    >

<include schemaLocation="weblogic-j2ee.xsd"/>

<element name="jdbc-data-source" type="wls:jdbc-data-sourceType"/>

<complexType name="jdbc-data-sourceType">
        <sequence>
            <element name="name" type="string" minOccurs="0"/>
            <element name="legacy-type" type="int" minOccurs="0"/>
            <element name="jdbc-driver-params" type="wls:jdbc-driver-paramsType" minOccurs="0"/>
            <element name="jdbc-connection-pool-params" type="wls:jdbc-connection-pool-paramsType" minOccurs="0"/>
            <element name="jdbc-data-source-params" type="wls:jdbc-data-source-paramsType" minOccurs="0"/>
            <element name="jdbc-xa-params" type="wls:jdbc-xa-paramsType" minOccurs="0"/>
        </sequence>
    </complexType>

<complexType name="jdbc-driver-paramsType">
        <sequence>
```

```xml
<element name="url" type="string" minOccurs="0"/>
<element name="driver-name" type="string" minOccurs="0"/>
<element      name="properties"      type="wls:jdbc-driver-propertiesType" minOccurs="0"/>
<element name="password-encrypted" type="base64Binary" minOccurs="0"/>
<element name="use-xa-data-source-interface" type="wls:true-falseType" minOccurs="0"/>
   </sequence>
  </complexType>

<complexType name="jdbc-driver-propertiesType">
    <sequence>
      <element      name="property"      type="wls:jdbc-driver-propertyType" minOccurs="0" maxOccurs="unbounded"/>
    </sequence>
  </complexType>

<complexType name="jdbc-driver-propertyType">
    <sequence>
      <element name="name" type="string" minOccurs="0"/>
      <element name="value" type="string" minOccurs="0"/>
    </sequence>
  </complexType>

<complexType name="jdbc-connection-pool-paramsType">
    <complexContent>
      <extension base = "wls:connection-pool-paramsType">
        <sequence>
          <element     name="inactive-connection-timeout-seconds"     type="int" minOccurs="0"/>
          <element name="test-table-name" type="string" minOccurs="0"/>
          <element name="login-delay-seconds" type="int" minOccurs="0"/>
          <element name="init-sql" type="string" minOccurs="0"/>
          <element name="statement-cache-size" type="int" minOccurs="0"/>
          <element name="statement-cache-type" type="string" minOccurs="0"/>
          <element     name="remove-infected-connections"     type="wls:true-falseType" minOccurs="0"/>
          <element name="seconds-to-trust-an-idle-pool-connection" type="int" minOccurs="0"/>
```

```xml
        <element name="test-statement-timeout" type="int" minOccurs="0"/>
        <element name="statement-timeout" type="int" minOccurs="0"/>
        <element name="prep-stmt-cache-profiling" type="wls:true-falseType" minOccurs="0"/>
        <element name="prep-stmt-cache-profiling-threshold" type="int" minOccurs="0"/>
        <element name="conn-leak-profiling" type="wls:true-falseType" minOccurs="0"/>
        <element name="profile-type" type="string" minOccurs="0"/>
        <element name="conn-profiling" type="wls:true-falseType" minOccurs="0"/>
        <element name="sql-stmt-profiling" type="wls:true-falseType" minOccurs="0"/>
        <element name="sql-stmt-param-logging" type="wls:true-falseType" minOccurs="0"/>
        <element name="sql-stmt-max-param-length" type="int" minOccurs="0"/>
        <element name="jdbc-xa-debug-level" type="int" minOccurs="0"/>
        <element name="credential-mapping-enabled" type="wls:true-falseType" minOccurs="0"/>
        <element name="driver-interceptor" type="string" minOccurs="0"/>
        <element name="failures-till-flush" type="int" minOccurs="0"/>
        <element name="refresh-failures-till-disable" type="int" minOccurs="0"/>
      </sequence>
    </extension>
  </complexContent>
</complexType>

<complexType name="jdbc-data-source-paramsType">
  <sequence>
    <element name="jndi-name" type="string" minOccurs="0"/>
    <element name="application-context-name" type="string" minOccurs="0"/>
    <element name="pool-name" type="string" minOccurs="0"/>
    <element name="row-prefetch" type="wls:true-falseType" minOccurs="0"/>
    <element name="row-prefetch-size" type="int" minOccurs="0"/>
    <element name="stream-chunk-size" type="int" minOccurs="0"/>
    <element name="algorithm-type" type="string" minOccurs="0"/>
    <element name="data-source-list" type="string" minOccurs="0"/>
    <element name="connection-pool-failover-callback-handler" type="string" minOccurs="0"/>
```

```xml
        <element    name="failover-request-if-busy"    type="wls:true-falseType"
minOccurs="0"/>
        <element         name="health-check-frequency-seconds"         type="int"
minOccurs="0"/>
        <element         name="global-transactions-protocol"         type="string"
minOccurs="0"/>
    </sequence>
  </complexType>

<complexType name="jdbc-xa-paramsType">
    <sequence>
        <element    name="supports-local-transaction"    type="wls:true-falseType"
minOccurs="0"/>
        <element  name="keep-xa-conn-till-tx-complete"  type="wls:true-falseType"
minOccurs="0"/>
        <element         name="need-tx-ctx-on-close"         type="wls:true-falseType"
minOccurs="0"/>
        <element         name="xa-end-only-once"         type="wls:true-falseType"
minOccurs="0"/>
        <element         name="new-xa-conn-for-commit"         type="wls:true-falseType"
minOccurs="0"/>
        <element    name="keep-logical-conn-open-on-release"    type="wls:true-
falseType" minOccurs="0"/>
        <element    name="resource-health-monitoring"    type="wls:true-falseType"
minOccurs="0"/>
        <element         name="recover-only-once"         type="wls:true-falseType"
minOccurs="0"/>
        <element    name="xa-set-transaction-timeout"    type="wls:true-falseType"
minOccurs="0"/>
        <element name="xa-transaction-timeout" type="int" minOccurs="0"/>
        <element    name="rollback-local-tx-upon-conn-close"    type="wls:true-
falseType" minOccurs="0"/>
    </sequence>
  </complexType>

</schema>
```

JDBCDataSourceBean

```
/**
 * @wld:bean
 * @root
 */
```

```java
public interface JDBCDataSourceBean
{
  /**
    * @key
    */
  public java.lang.String getName();

public void setName(java.lang.String name);

/**
    * @default JDBCLegalHelper.BEAN_TYPE_NONE
    */
  public int getLegacyType();

public void setLegacyType(int legacyType);

public                    weblogic.j2ee.descriptor.wl.JDBCDriverParamsBean
getJDBCDriverParams();
  public             weblogic.j2ee.descriptor.wl.JDBCConnectionPoolParamsBean
getJDBCConnectionPoolParams();

public                weblogic.j2ee.descriptor.wl.JDBCDataSourceParamsBean
getJDBCDataSourceParams();

public weblogic.j2ee.descriptor.wl.JDBCXAParamsBean getJDBCXAParams();
} public interface JDBCDriverParamsBean
{
  public java.lang.String getUrl();

public void setUrl(java.lang.String url);

public java.lang.String getDriverName();

public void setDriverName(java.lang.String driverName);

public                 weblogic.j2ee.descriptor.wl.JDBCDriverPropertiesBean
getProperties();
```

```java
  public java.lang.String getPassword();

public void setPassword(java.lang.String password);

public byte[] getPasswordEncrypted();

public void setPasswordEncrypted(byte[] passwordEncrypted);

/**
   * @default true
   */
  public boolean isUseXaDataSourceInterface();

public void setUseXaDataSourceInterface(boolean useXaDataSourceInterface);
} public interface JDBCConnectionPoolParamsBean extends ConnectionPoolParamsBean
{

/**
   * @default ServerLegalHelper.DEFAULT_THREAD_POOL_SIZE
   * @configurable
   */
  public int getMaxCapacity();

public void setMaxCapacity(int maxCapacity);

/**
   * @default 10
   * @configurable
   */
  public int getConnectionReserveTimeoutSeconds();

public void setConnectionReserveTimeoutSeconds(int connectionReserveTimeoutSeconds);
```

```
/**
 * @default java.lang.Integer.MAX_VALUE
 * @configurable
 */
public int getHighestNumWaiters();

public void setHighestNumWaiters(int highestNumWaiters);

/**
 * @default 0
 * @configurable
 */
public int getInactiveConnectionTimeoutSeconds();

public     void     setInactiveConnectionTimeoutSeconds(int inactiveConnectionTimeoutSeconds);

/**
 * @configurable
 */
public java.lang.String getTestTableName();

public void setTestTableName(java.lang.String testTableName);

/**
 * @default 0
 * @configurable
 */
public int getLoginDelaySeconds();

public void setLoginDelaySeconds(int loginDelaySeconds);

/**
 * @non-dynamic
 * @configurable
 */
public java.lang.String getInitSql();
```

```
public void setInitSql(java.lang.String initSql);

/**
 * @default JDBCLegalHelper.DEFAULT_CACHE_STATEMENTS_SIZE
 * @configurable
 */
public int getStatementCacheSize();

public void setStatementCacheSize(int statementCacheSize);

/**
 * @default JDBCLegalHelper.STATEMENT_CACHE_TYPE_DEFAULT
 * @configurable
 * @non-dynamic
 */
public java.lang.String getStatementCacheType();

public void setStatementCacheType(java.lang.String statementCacheType);

/**
 * @default true
 * @configurable
 * @non-dynamic
 */
public boolean isRemoveInfectedConnections();

public             void             setRemoveInfectedConnections(boolean
removeInfectedConnections);

/**
 * @default 0
 * @configurable
 * @non-dynamic
 */
public int getSecondsToTrustAnIdlePoolConnection();

public           void           setSecondsToTrustAnIdlePoolConnection(int
secondsToTrustAnIdlePoolConnection);
```

```
/**
 * @default -1
 * @non-dynamic
 * @configurable
 * rhltbd - make it dynamic
 */
public int getTestStatementTimeout();

public void setTestStatementTimeout(int testStatementTimeout);

/**
 * @default -1
 * @non-dynamic
 * @configurable
 * rhltbd - make it dynamic
 */
public int getStatementTimeout();

public void setStatementTimeout(int statementTimeout);

/**
 * @default false
 * @non-dynamic
 * @configurable
 */
public boolean isPrepStmtCacheProfiling();

public void setPrepStmtCacheProfiling(boolean prepStmtCacheProfiling);

/**
 * @default 10
 * @non-dynamic
 * @configurable
 */
public int getPrepStmtCacheProfilingThreshold();
```

```java
public void setPrepStmtCacheProfilingThreshold(int prepStmtCacheProfilingThreshold);

/**
 * @default false
 * @non-dynamic
 * @configurable
 */
public boolean isConnLeakProfiling();

public void setConnLeakProfiling(boolean connLeakProfiling);

/**
 * @default JDBCLegalHelper.PROFILE_TYPE_NONE
 * @dynamic
 * @configurable
 */
public String getProfileType();

public void setProfileType(String profileType);

/**
 * @default false
 * @non-dynamic
 * @configurable
 */
public boolean isConnProfiling();

public void setConnProfiling(boolean connProfiling);

/**
 * @default false
 * @non-dynamic
 * @configurable
 */
public boolean isSqlStmtProfiling();

public void setSqlStmtProfiling(boolean sqlStmtProfiling);
```

```
/**
 * @default false
 * @non-dynamic
 * @configurable
 */
public boolean isSqlStmtParamLogging();

public void setSqlStmtParamLogging(boolean sqlStmtParamLogging);

/**
 * @default 10
 * @non-dynamic
 * @configurable
 */
public int getSqlStmtMaxParamLength();

public void setSqlStmtMaxParamLength(int sqlStmtMaxParamLength);

/**
 * @default 10
 * @non-dynamic
 * @configurable
 */
public int getJDBCXADebugLevel();

public void setJDBCXADebugLevel(int jdbcXaDebugLevel);

/**
 * @default false
 * @configurable
 * @dynamic
 * rhltbd - Fei - make this dynamic
 */
public boolean isCredentialMappingEnabled();

public void setCredentialMappingEnabled(boolean credentialMappingEnabled);
```

```
/**
 * @non-dynamic
 * @configurable
 */
public String getDriverInterceptor();

public void setDriverInterceptor(String driverInterceptor);

/**
 * Set the number of consecutive failures to replace dead pool connections
 * before we disable the pool. Zero means we will never disable the pool.
 *
 * @configurable
 * @dynamic
 * @default 0
 */
int getCountOfRefreshFailuresTillDisable();

/**
 * Set the number of consecutive failures to replace dead pool connections
 * before we disable the pool. Zero means we will never disable the pool.
 */
void setCountOfRefreshFailuresTillDisable(int newVal);

/**
 * Get the number of consecutive failed pool connection tests
 * before we close all the connections the pool. Zero means we
 * will never close all the connections at once for that reason.
 *
 * @configurable
 * @dynamic
 * @default 0
 */
int getCountOfTestFailuresTillFlush();
```

```java
/**
 * Set the number of consecutive failed pool connection tests
 * before we close all the connections the pool. Zero means we
 * will never close all the connections in the pool.
 */
void setCountOfTestFailuresTillFlush(int newVal);

} public interface JDBCDataSourceParamsBean
{
    public java.lang.String getJndiName();

public void setJndiName(java.lang.String jndiName);

public java.lang.String getApplicationContextName();

public             void           setApplicationContextName(java.lang.String applicationContextName);

public java.lang.String getPoolName();

public void setPoolName(java.lang.String poolName);

public boolean isRowPrefetch();

public void setRowPrefetch(boolean rowPrefetch);

/**
     * @default 48
     */
    public int getRowPrefetchSize();

public void setRowPrefetchSize(int rowPrefetchSize);

/**
     * @default 256
     */
```

```java
public int getStreamChunkSize();

public void setStreamChunkSize(int streamChunkSize);

/**
 * @default JDBCLegalHelper.ALGORITHM_FAILOVER
 */
public java.lang.String getAlgorithmType();

public void setAlgorithmType(java.lang.String algorithmType);

/**
 * @default null
 */
public java.lang.String getDataSourceList();

public void setDataSourceList(java.lang.String dataSourceList);

public java.lang.String getConnectionPoolFailoverCallbackHandler();

public void setConnectionPoolFailoverCallbackHandler(java.lang.String connectionPoolFailoverCallbackHandler);

public boolean isFailoverRequestIfBusy();

public void setFailoverRequestIfBusy(boolean failoverRequestIfBusy);

/**
 * @default 300
 */
public int getHealthCheckFrequencySeconds();

public void setHealthCheckFrequencySeconds(int healthCheckFrequencySeconds);

/**
 * @default JDBCLegalHelper.TX_PROTO_ONE_PHASE_COMMIT
 */
```

```java
  public java.lang.String getGlobalTransactionsProtocol();

public          void          setGlobalTransactionsProtocol(java.lang.String
globalTransactionsProtocol);
} public interface JDBCXAParamsBean
{
  public boolean isSupportsLocalTransaction();

public void setSupportsLocalTransaction(boolean supportsLocalTransaction);

public boolean isKeepXaConnTillTxComplete();

public void setKeepXaConnTillTxComplete(boolean keepXaConnTillTxComplete);

public boolean isNeedTxCtxOnClose();

public void setNeedTxCtxOnClose(boolean needTxCtxOnClose);

public boolean isXaEndOnlyOnce();

public void setXaEndOnlyOnce(boolean xaEndOnlyOnce);

public boolean isNewXaConnForCommit();

public void setNewXaConnForCommit(boolean newXaConnForCommit);

public boolean isKeepLogicalConnOpenOnRelease();

public          void          setKeepLogicalConnOpenOnRelease(boolean
keepLogicalConnOpenOnRelease);

/*
   * @default true
   */
  public boolean isResourceHealthMonitoring();
```

```
  public void setResourceHealthMonitoring(boolean resourceHealthMonitoring);

public boolean isRecoverOnlyOnce();

public void setRecoverOnlyOnce(boolean recoverOnlyOnce);

public boolean isXaSetTransactionTimeout();

public void setXaSetTransactionTimeout(boolean xaSetTransactionTimeout);

public int getXaTransactionTimeout();

public void setXaTransactionTimeout(int xaTransactionTimeout);

public boolean isRollbackLocalTxUponConnClose();

public          void          setRollbackLocalTxUponConnClose(boolean
rollbackLocalTxUponConnClose);
}
```

JDBCSystemResourceMBean

```
/**
 * This bean defines a system-level JDBC resource.  It links a separate
 * descriptor that specifies the definition.
 */
public interface JDBCSystemResourceMBean extends SystemResourceMBean
{
  /**
   * @return root bean of JDBC descriptor
   * @transient
   */
  JDBCDataSourceBean getJDBCResource();
}
```

New Runtime MBeans

```
/**
 * This class is used for monitoring a Weblogic JDBC Data Source and
 * its associated connection pool.
 */
```

```
public interface JDBCDataSourceRuntimeMBean extends ComponentRuntimeMBean {
  /**
   * Test this datasource's pool by reserving and releasing a connection
   * from it. If the pool configuration attribute TestConnectionsOnReserve
   * or TestConnectionsOnRelease is enabled, the acquired connection is
   * also tested as part of the reserve and release operation.
   *
   * @see weblogic.management.configuration.JDBCConnectionPoolMBean
   * @return returns null upon success, else returns stacktrace
   */
  String testPool();

/**
   * @return Number of leaked connections. Leaked connection is
   * a connection that was checked out from the connection pool
   * but was not returned to the pool by calling close ().
   */
  public int getLeakedConnectionCount();

/**
   * @return Boolean indicating pool is enabled or disabled.
   * <code>true</code> if the pool is enabled.
   * <code>false</code> if the pool is disabled.
   */
  public boolean isEnabled();

/**
   * Returns the current state of the connection pool:
   *   <br><code>Running</code>  if  the  pool  is  enabled  (deployed and  not
SUSPENDED).
   * This is the normal state of the connection pool.
   *   <br><code>Suspended</code> if the pool disabled.
   *   <br<code>Shutdown</code>  if  the  pool  is  shutdown  and  all  database
connections have been closed.
   *   <br><code>Unknown</code> if the pool state is unknown.
   *   <br><code>Unhealthy</code>  if  all  connections  are  unavailable  (not
because they are in use). This state
   * occurs if the database server is unavailable when the connection pool is
created (creation retry
```

```
 * must be enabled) or if all connections have failed connection tests (on
creation, on reserve,
 * on release, or periodic testing).
 * @return Current state of the connection pool.
 *
 */
public String getState();

/**
 * @return Number of cases when a connection pool
 * attempted to refresh a connection to a database
 * and failed. Failure may happen because of database
 * unavailablity or broken connection to the database.
 */
public int getFailuresToReconnectCount();

/**
 * @return Averaged time necessary to get a connection
 * from the database. This is how long it takes to get
 * physical connection from database. It is calculated
 * as summary time to connect divided by summary number
 * of connections. Return value is milliseconds.
 */
public int getConnectionDelayTime();

/**
 * @return Number of times cache was accessed - a cumulative,
 * running count of the use of the cache.
 */
public long getPrepStmtCacheAccessCount();

/**
 * @return Number of statements added to the cache - a cumulative,
 * running count of the use of the cache.
 */
public long getPrepStmtCacheAddCount();
```

```
/**
 * @return Number of statements discarded from the cache
 * - a cumulative, running count of the use of the cache.
 */
public long getPrepStmtCacheDeleteCount();

/**
 * @return Number of statements currently residing in the cache.
 */
public int getPrepStmtCacheCurrentSize();

/**
 * @return Frequency of use of prepared statements
 * cache - a cumulative, running count of the use of
 * each cached statement
 */
public int getPrepStmtCacheHitCount();

/**
 * @return Number of cases the cache does not satisfy
 * the statement - a similar count (with SQL) of cases
 * when the cache does not have a cached statement to
 * satisfy a request.
 */
public int getPrepStmtCacheMissCount();

/**
 * @return Current total number of active connections.
 */
public int getActiveConnectionsCurrentCount();

/**
 * @return Current total number waiting for a connection.
 */
public int getWaitingForConnectionCurrentCount();

/**
```

```
 * @return Version of the JDBC driver, in the format of
 * concatenating the Driver class name with 'major: XX, minor: YY'.
 */
public String getVersionJDBCDriver();

/**
 * @return The high water mark of active connections
 * in this pool.
 * <p>
 * Note that this is an optimization method for a highly
 * useful statistic that could be implemented less efficiently
 * using change notification.</p>
 */
public int getActiveConnectionsHighCount();

/**
 * @return The running average of active connections
 * in this pool.
 */
public int getActiveConnectionsAverageCount();

/**
 * @return The cumulative count of requests for connections
 * from this pool.
 */
public long getReserveRequestCount();

/**
 * @return The cumulative count of requests for connections
 * from this pool that could not be fulfilled.
 */
public long getFailedReserveRequestCount();

/**
 * @return The high water mark of waiters for a connection
 * from this pool.
 * <p>
```

```
 * Note that this is an optimization method for a highly
 * useful statistic that could be implemented less efficiently
 * using change notification.</p>
 */
public int getWaitingForConnectionHighCount();

/**
 * @return Cumulative count of waiters for connections.
 */
public long getWaitingForConnectionTotal();

/**
 * @return Cumulative count of waiters for connections
 * that successfully obtained a connnection.
 */
public long getWaitingForConnectionSuccessTotal();

/**
 * @return Cumulative count of waiters for connections
 * that were unable to obtain a connnection.
 */
public long getWaitingForConnectionFailureTotal();

/**
 * @return The number of seconds the longest waiter for
 * a connection waited.
 */
public int getWaitSecondsHighCount();

/**
 * Returns the cumulative total number of JDBC connections
 * created in this pool, since the pool was deployed.
 */
public int getConnectionsTotalCount();

/**
 * Returns the current capacity of this pool.
```

```
 */
public int getCurrCapacity();

/**
 * Returns the high watermark of current capacity of this pool.
 */
public int getCurrCapacityHighCount();

/**
 * Returns the number of available connections in this pool
 */
public int getNumAvailable();

/**
 * Returns the highest number of available connections in this pool
 */
public int getHighestNumAvailable();

/**
 * Returns the number of unavailable connections in this pool
 */
public int getNumUnavailable();

/**
 * Returns the highest number of unavailable connections in this pool
 */
public int getHighestNumUnavailable();

/**
 * Shrinks the named database ConnectionPool to the max of
 * the currently reserved connections or the initial size.
 * <p>
 * This is a privileged method, and can only be invoked on a
 * client that has specified an authorized Principal.</p>
 *
 * @exception            Exception if there is an error
 */
```

```
public void    shrink()        throws Exception;

/**
 * Resets the connection pool by shutting down and
 * reestablishing all the pool connections. This method should
 * be used when the connection pool is in a bad state and needs
 * to be reinitialized.
 * <p>
 * This is a privileged method, and can only be invoked on a
 * client that has specified an authorized Principal.</p>
 *
 * @exception          Exception if there is an error
 */
public void reset()    throws Exception;

/**
 * Disables the connection pool, suspending all operations on pool
 * connections until the pool is re-enabled.
 * <p>
 * This is a privileged method, and can only be invoked on a
 * client that has specified an authorized Principal.</p>
 *
 * @exception          Exception if there is an error
 */
public void    suspend() throws Exception;

/**
 * Forcibly disables the pool, suspending all operations on pool
 * connections until the pool is re-enabled. All current
 * users of the pool are forcibly disconnected. All connections
 * currently in use are closed and recreated.
 * <p>
 * This is a privileged method, and can only be invoked on a
 * client that has specified an authorized Principal.</p>
 *
 * @exception          Exception if there is an error
 */
```

```
public void    forceSuspend() throws Exception;

/**
 * Shuts down the pool. If any connections from the pool are
 * currently in use, the operation will fail.
 * <p>
 * This is a privileged method, and can only be invoked on a
 * client that has specified an authorized Principal.</p>
 *
 * @exception           Exception if there is an error
 */
public void    shutdown() throws Exception;

/**
 * Forcibly shuts down the connection pool. All current users of the pool are
 * forcibly disconnected.
 * <p>
 * This is a privileged method, and can only be invoked on a
 * client that has specified an authorized Principal.</p>
 *
 * @exception           Exception if there is an error
 */
public void    forceShutdown() throws Exception;

/**
 * Restores all access to and operations on a connection pool that has been suspended
 * (marked as disabled).
 * <p>
 * This is a privileged method, and can only be invoked on a
 * client that has specified an authorized Principal.</p>
 *
 * @exception           Exception if there is an error
 */
public void    resume() throws Exception;

/**
```

```
 * Returns the properties for a pool.
 * <p>
 * This is a privileged method, and can only be invoked on a
 * client that has specified an authorized Principal.</p>
 *
 * @exception            Exception if there is an error
 */
public java.util.Properties getProperties() throws Exception;

/**
 * Does a pool with the given name exist?
 * <p>
 * This is a privileged method, and can only be invoked on a
 * client that has specified an authorized Principal.</p>
 *
 * @param name           Name of the pool being looked for
 *
 * @exception            Exception if there is an error
 */
public boolean poolExists(String poolName) throws Exception;

/**
 * Clears the cache of Prepared and Callable Statements maintained
 * for each connection in the connection pool.
 *
 * @exception            Exception if there is an error
 */
public void clearStatementCache() throws Exception;

/**
 * Prints out information about all the connections in the pool.
 */
public void dumpPool() throws Exception;

/**
 * Prints out profile information about the connection pool.
 */
```

```java
    public void dumpPoolProfile() throws Exception;

/*
     * Sets the JDBCDriverRuntimeMBean associated with this data source.
     */
    public void setJDBCDriverRuntime(JDBCDriverRuntimeMBean mbean);

/*
     * Gets the JDBCDriverRuntimeMBean associated with this data source.
     */
    public JDBCDriverRuntimeMBean getJDBCDriverRuntime();
}

/**
 * This class is used for monitoring a Weblogic JDBC Multi Data Source
 * and its associated data sources.
 *
 * @exclude
 */
public interface JDBCMultiDataSourceRuntimeMBean extends
    ComponentRuntimeMBean {

/**
     * Returns the maximum capacity of this multi data source.
     *
     * The maximum capacity is:
     *
     * - max capacity of first available (not suspended) data source
     *   in list, if multi data source is using "pure" FAILOVER algorithm
     *   (FailoverRequestIfBusy flag not set)
     *
     * - sum of max capacities of all available (not suspended) data
     *   sources, if multi data source is using other algorithms
     */
    int getMaxCapacity();
}
```

JSR77 SUPPORT

```
/**
 * <p>This class maps to a JDBCDriver JMO</p>
 */
public interface JDBCDriverRuntimeMBean extends RuntimeMBean {}

/**
 * <p>This class is used for monitoring a WebLogic JDBC service. It maps to a
 JDBCResource JMO.</p>
 */
public interface JDBCServiceRuntimeMBean extends RuntimeMBean {

/**
   * Returns the list of JDBCDataSourceRuntimeMBeans created in
   * this domain.
   */
  JDBCDataSourceRuntimeMBean[] getJDBCDataSourceRuntimeMBeans();

/**
   * Returns the list of JDBCDriverRuntimeMBeans created in
   * this domain.
   */
  JDBCDriverRuntimeMBean[] getJDBCDriverRuntimeMBeans();
}
```

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system including:
   Java Database Connectivity (JDBC) data sources that are configurable with XML configuration files, the XML configuration files being used to obtain configuration information for the Java Database Connectivity (JDBC) data sources;
   wherein the XML configuration files are converted to Java Database Connectivity (JDBC) configuration MBeans for the Java Database Connectivity (JDBC) data sources;
   wherein new binding variables are used to update test JDBC configuration XML to production JDBC configuration XML, and wherein the test JDBC configuration XML is used to produce test JDBC configuration MBeans and the production JDBC configuration XML is used to produce test JDBC configuration Mbeans;
   further comprising a tool to convert the XML configuration files into configuration objects for the Java Database Connectivity (JDBC) data sources;
   wherein migration to a new environment can include producing an updated XML configuration file;
   wherein a tool is used to update the XML file by inputting new binding variables;
   wherein the XML configuration files can be locally or globally scoped;
   wherein an XML schema is used; and
   wherein the system includes at least one processor.

2. The system of claim 1, wherein a tool can provide a two phase deployment of a configuration such that if the deployment of the update configuration fails, the configuration is rolled back to a previous configuration.

3. A system including:
   Java Database Connectivity (JDBC) data sources that are configurable with XML configuration files, the XML configuration files being used to obtain configuration information for the Java Database Connectivity (JDBC) data sources and;
   a tool to modify XML configuration files to produce updated XML configuration files;
   wherein the XML configuration files are converted to Java Database Connectivity (JDBC) configuration MBeans for the Java Database Connectivity (JDBC) data sources;
   wherein new binding variables are used to update test JDBC configuration XML to production JDBC configuration XML, and wherein the test JDBC configuration XML is used to produce test JDBC configuration MBeans and the production JDBC configuration XML is used to produce test JDBC configuration Mbeans;
   further comprising a tool to convert the XML configuration files into configuration objects for the Java Database Connectivity (JDBC) data sources;
   wherein migration to a new environment can include producing an updated XML configuration file;
   wherein a tool is used to update the XML file by inputting new binding variables;
   wherein the XML configuration files can be locally or globally scoped;
   wherein an XML schema is used; and
   wherein the system includes at least one processor.

4. The system of claim 3, wherein a tool can provide a two phase deployment of a configuration such that if the deployment of the update configuration fails, the configuration is rolled back to a previous configuration.

5. A system including:
   a tool to create at least one XML configuration file for a Java Database Connectivity (JDBC) data source; and
   a component to use the XML file to configure the Java Database Connectivity (JDBC) data source;
   wherein the XML configuration files are converted to Java Database Connectivity (JDBC) configuration MBeans for the Java Database Connectivity (JDBC) data sources;
   wherein new binding variables are used to update test JDBC configuration XML to production JDBC configuration XML, and wherein the test JDBC configuration XML is used to produce test JDBC configuration MBeans and the production JDBC configuration XML is used to produce test JDBC configuration Mbeans;
   further comprising a tool to convert the XML configuration files into configuration objects for the Java Database Connectivity (JDBC) data sources;
   wherein migration to a new environment can include producing an updated XML configuration file;

wherein a tool is used to update the XML file by inputting new binding variables;
wherein the XML configuration files can be locally or globally scoped;
wherein an XML schema is used; and
wherein the system includes at least one processor.

6. The system of claim 5, wherein a tool can provide a two phase deployment of a configuration such that if the deployment of the update configuration fails, the configuration is rolled back to a previous configuration.

* * * * *